Figure 1:
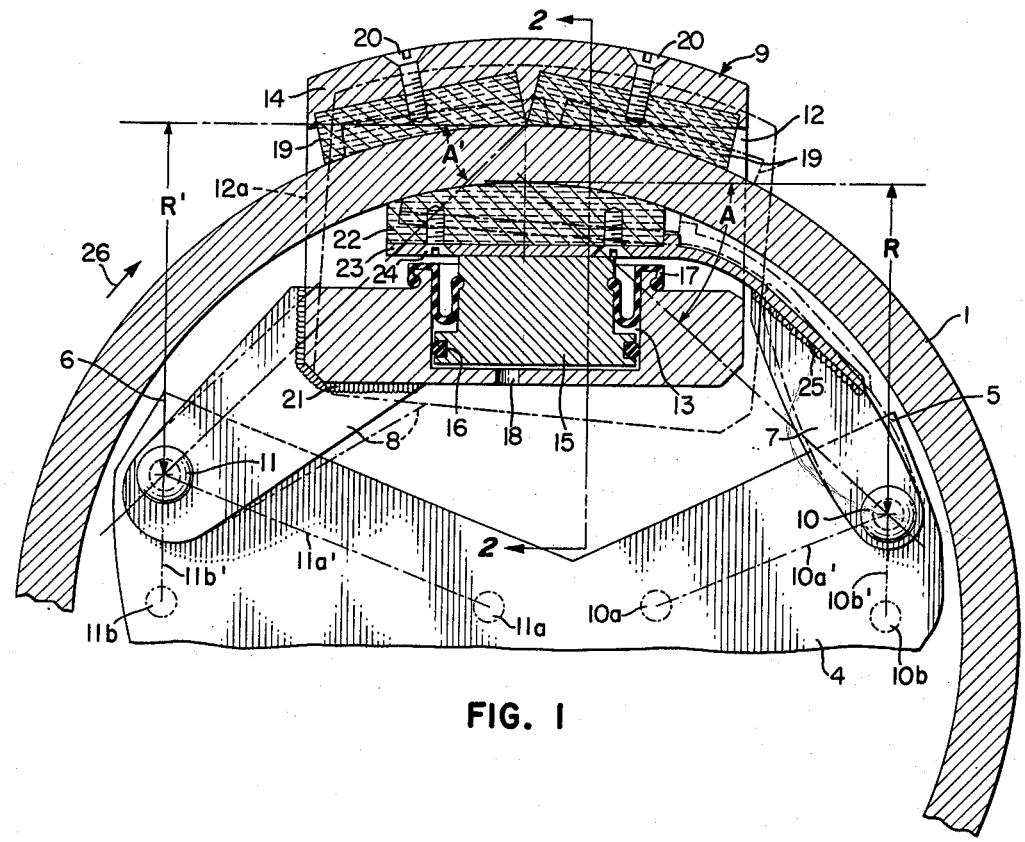

Feb. 23, 1965     T. FRAYER     3,170,542

SELF-ENERGIZING RING DISC BRAKE

Filed Aug. 27, 1963

INVENTOR.
THEODORE FRAYER
BY
*J.B. Holden*
ATTORNEY

United States Patent Office 3,170,542
Patented Feb. 23, 1965

3,170,542
SELF-ENERGIZING RING DISC BRAKE
Theodore Frayer, North Canton, Ohio, assignor to The Goodyear Tire & Rubber Company, Akron, Ohio, a corporation of Ohio
Filed Aug. 27, 1963, Ser. No. 304,901
10 Claims. (Cl. 188—76)

This invention relates to a self-energizing ring disc brake, and more particularly to a ring disc type brake wherein no guide means are necessary for the pressure actuation means as the frictional forces to the ring disc are equal and oppositely applied to effectively cancel each other to substantially eliminate radial forces on the ring disc, and wherein the friction elements are pivotally mounted to eliminate cocking thereof.

Heretofore it has been known that considerable difficulties have been experienced in ring disc type braking units with excessive stress placed on the wheel bearings because the pressures applied to opposite sides of the ring disc were not equal and opposite to eliminate radial forces in the brake unit. Further, cocking of the piston has resulted because usually a friction pad is mounted directly thereto causing uneven brake friction pad wear with resultant inferior braking action, shorter braking life and higher operating expense. Further, the usual design of ring-disc brake units is for one of the friction pads to be non-self-energizing when the ring disc is rotating in its normal direction which means that higher forces must be applied to the pressure actuating unit in order to achieve sufficient braking action by the friction surfaces engaging the ring disc. This results in the unbalanced radial forces mentioned above causing higher brake wear with less braking force applied per unit amount of pressure.

It is the general object of the present invention to avoid and overcome the foregoing and other difficulties of prior art practices by the provisions of a compact, self-energizing ring-disc brake unit which requires no guide means for the pressure actuating piston since all radial forces in the brake unit are substantially equal and opposite to thereby cancel each other.

A further object of the invention is to provide an improved ring-disc brake unit which gives uniform and consistent braking action, provides substantially even brake disc wear, which is rugged, durable, and low in cost.

Another object of the invention is to provide a ring-disc brake unit which has friction pads pivotally mounted on separate mounting means so that the pads tend to pivot against their respective surfaces of the ring disc in a self energizing action when the ring disc is rotating in the normal direction and the pads are engaged therewith to eliminate cocking of the friction pads or actuation means.

Another object of the invention is to provide a ring-disc brake unit which utilizes friction pads having substantially the same engaging surface area, which pads engage the ring disc on opposed faces thereof to effect equal and oppposite radial forces which substantially cancel each other.

The aforesaid objects of the invention and other objects which will become apparent as the description proceeds are achieved by providing in a brake, a rotatable member having concentric inner and outer surfaces, a stationary member, a first brake shoe pivotally mounted on the stationary member and engaging with the outer surface of the rotatable member with a self energizing action upon one way rotation of the rotary member, a second brake shoe pivotally mounted on the stationary member and engaging with the inner surface of the rotatable member, substantially opposite the first brake shoe, with a self energizing action upon said one way rotation of the rotary member, said self energizing actions of the first and second brake shoes substantially counterbalancing each other to eliminate any radial force tending to move the rotary member out of rotary balance, and means for moving the shoes to and from engagement with the rotary member.

Figure 2:
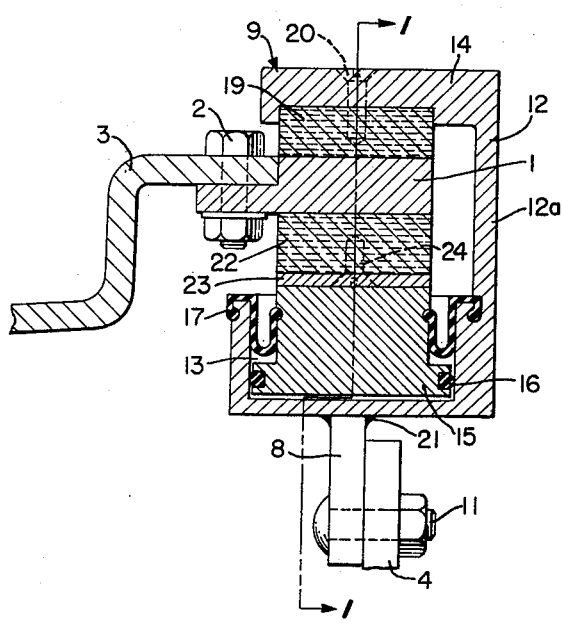

For a better understanding of the invention reference should be had to the accompanying drawings, wherein:

FIGURE 1 is a vertical cross sectional fragmentary view of a brake unit employing the embodiments of the invention taken substantially on the line 1—1 of FIGURE 2; and FIGURE 2 is a vertical cross sectional fragmentary view of the brake unit of FIGURE 1 taken substantially on the line 2—2 of FIGURE 1.

While the brake unit of the invention is adaptable for use with any rotating object, it is generally utilized in relation to rotating wheels, and hence it has been so illustrated and will be so described.

With reference to FIGURE 1 of the drawings, the numeral 1 indicates generally the rotary brake member, this taking the form of a radially thick endless metal ring disc which is adapted to be affixedly secured on one side, as by bolts 2, to a wheel 3 or other member to be braked, as best seen in FIGURE 2. The ring disc 1 is shown mounted at the side of the tire bead retaining flange to provide a maximum radius brake torque arm so that the diameter of the brake piston and facing areas of the brake friction pads hereinafter described, can be kept to a minimum. Conventional mounting, such as those employed in present automotive drum brake, is also practical.

The stationary portion of the brake assembly includes a metal torque plate 4 adapted to be secured, for example, to a fixed axle (not shown) rotatably supporting the wheel 3. The torque plate 4 is formed with a pair of integral outwardly extending portions 5 and 6, respectively. A pair of pivot arms 7 and 8, respectively, are pivotally mounted to portions 5 and 6 to support the brake unit, indicated as a whole by the numeral 9. The arms 7 and 8 are mounted to portions 5 and 6 by bolt means 10 and 11, respectively, which allow pivotal movement thereof, but which pivotal movement is adjustable to be rather tight or binding so that arms 7 and 8 do not pivot freely. This eliminates flopping or movement of the arms 7 and 8 when the brake unit 9 is not actuated, and insures the arms holding in a non-drag position upon brake release.

The brake unit 9 comprises a substantially C-shaped housing 12 which operatively fits around the ring disc 1, as best seen in FIGURE 2. The housing 12 contains an integral cylinder 13 formed on the radially inner portion thereof, and a top extending flange 14 on the radially outer portion thereof. A piston 15 is slidably received in the cylinder 13 with a conventional O-ring seal 16 to insure no leakage of fluid entering beneath the piston through an access opening 18. Flexible top seal 17 provides an environmental seal for the cylinder cavity and piston.

A pair of blocks or pads of friction material 19 are removably affixed by screw means 20 to the top extending flange 14 of housing 12. The friction blocks 19 are operatively aligned adjacent the radially outer surface of ring disc 1. In a like manner, the piston 15 is operatively aligned adjacent the radially inner surface of ring disc 1. It should further be noted that pivotal mounting lever 8 can be affixed to housing 12 in any convenient manner, such as by welding as at 21. The invention also contemplates that the housing 12 and pivotal mounting lever 8 may be made as one integral unit. The invention further contemplates that the housing 12 may be made in separate units comprising the top flange 14, the cylinder 13, and a side plate 12a, with appropriate conventional means to hold the parts together to form the housing 12.

The invention further contemplates that the friction block 19 may be one integral block of friction material, or may be broken into two or more blocks, as indicated in FIGURE 1.

A radially inner block of friction material 22 is mounted to a substantially flat carrying plate 23 by screw means 24 or other suitable means. The plate 23 carrying friction pad 22 merely rides on top of piston 15. The plate 23 is operatively affixed to pivot arm 7 by conventional means, such as welding indicated at 25 or these parts may be made integral. Thus, friction block 22 is located adjacent the radially inner surface of ring disc 1 in substantially opposed relationship to friction blocks 19. Further, it should be noted that the respective facing surface areas of blocks 19 and 23 are substantially the same. Blocks 19 have rounded ends but are slightly longer so that the surface areas engaging ring disc 1 are substantially the same. Thus, with the same facing area and the same friction material in blocks 19 and 22, the lining wear will be equalized.

The normal direction of rotation of ring disc 1 is indicated by arrow 26. This means when fluid pressure is applied through opening 18 beneath piston 15 it causes plate 23 to move upwardly and engage friction block 22 with the radially inner surface of ring disc 1. When friction block 22 engages the radially inner surface of ring disc 1 it creates an equal and opposite force which pushes housing 12 downwardly forcing friction blocks 19 against the radially outer surface of ring disc 1.

The self energizing action of the brake is achieved when the ring disc 1 rotates in the direction of the arrow 26 of FIGURE 1 and the brake is applied as described above. The frictional drag between friction block 22 and ring disc 1 then acts on a torque arm of a length indicated by a radius R and the frictional drag between friction blocks 19 and ring disc 1 acts on a torque arm of a length indicated by a radius R' to provide a turning moment about pins 10 and 11, respectively to force the blocks 22 and 19 still more tightly into engagement with the inner and outer peripheries of the ring disc 1. It is contemplated that radii R and R', and angles A and A', be substantially equal to insure the same amount of self-energization to brake pads 19 and 22. The self energization is achieved because friction block 22 is pivotally mounted in a substantially downstream direction by pin 10 thereby tending to pivot friction block 22 in a clockwise direction when the brake is energized. Likewise, self energization occurs to friction blocks 19 because brake unit 9 is pivotally mounted by pin 11 in a substantially upstream direction thereby tending to pivot friction blocks 19 in a clockwise direction when the brake is energized.

The angles A and A' can be increased or decreased by rearranging the positions of pins 10 and 11. For example, pin 10 could be positioned at dotted line positions 10a or 10b, or anywhere along dotted lines 10a' or 10b'. This would substantially increase the angle A to increase the amount of self energization to friction block 22. In a like manner, pin 11 could be positioned at dotted line locations 11a or 11b, or anywhere along dotted lines 11a' or 11b'. This would increase the angle A' thereby increasing the amount of self energization to friction blocks 19. In a like manner, the position of pins 10 and 11 could be moved so as to decrease the angles A and A' to thereby decrease the amount of self energization to the brake. Again it should be remembered that regardless of the position of pins 10 and 11, the angles A and A' should be substantially the same to insure equal self-energization of the friction pads 19 and 22.

The amount of self energization in a brake unit of this type is dependent on the coefficient of friction and the pivot angles preferably are somewhat lower than the self locking valve. The coefficient of friction of the friction blocks 19 and 22 can be altered by the use of different composition friction blocks to further control the extent of the self-energization action. The invention contemplates that the composition of friction buttons 19 and 22 will be substantially the same since it is desired that equal, but opposite radial forces are directed onto ring disc 1 to effectively cancel each other. Further, since the friction blocks 19 and 22 are both pivotally mounted no misalignment of the friction blocks can take place. Thus, no guide pins or alignment structure is necessary to prevent undue cocking or tilting of piston 15, or of friction blocks 19 and 22.

It should be understood that pivotal arms 7 and 8 are substantially centrally positioned in relation to ring disc 1 and are in alignment with each other to further insure that the radial forces created by the engagement of the friction blocks with ring disc 1 are equal and opposite to effect cancellation thereof.

By virtue of the self-energizing feature described, the brake can be designed for a desired controllable additional torque, usually up to at least 50% and generally about 100% more torque. The brake friction radius is greater than in most brakes with the ring disc 1 being out adjacent the bead seat of the pneumatic tire. Thus, an operator can handle a much heavier vehicle with no larger brake and with no more effort on the brake pedals.

With reference to FIGURE 1, the dotted lines have been provided to illustrate the relationship of the brake unit 9 after friction blocks 19 and 22 have worn a considerable extent. It should be noted that wear is substantially even and that the friction blocks are still oppositely aligned in relation to ring disc 1 so that the cancellation of the radial forces is still effected. The only change is that piston 15 is moved outwardly due to the usage and piston motion magnitude is the same for new or worn linings due to friction in the pivots as described above. Although the dotted line positions indicate the relation of the pivotal arm 7 and 8 and the brake unit 9 after some wear to the friction blocks, the brake unit 9 actually moves toward the position indicated by the dotted lines when pressure is applied to piston 15 to create the self-energizing feature as described above.

Thus it is seen that the objects of the invention are achieved by providing a sturdy, simple brake unit which has each friction block pivotally mounted so that when the blocks engage the rotating member they tend to pivot into the rotating member to cause further self-energization of the brake. The pivotal mounting of the friction blocks eliminates any misalignment thereof thereby eliminating the necessity for guide pins or other alignment structure. Also, the friction blocks are opposing each other and cover the same surface area in relation to the ring-disc so that equal and opposite radial forces are created which cancel each other to substantially eliminate any unbalance to the ring disc. All torque forces created by the brake are absorbed by the torque plate.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a brake for a rotatable member the combination of
   a non-rotatable torque plate,
   an endless ring disc operatively affixed to the rotatable member,
   a C-shaped housing pivotally mounted to the torque plate and operatively positioned around said ring disc, said pivotal mounting being in an upstream direction from the housing in relation to the normal direction of rotation of the ring disc,
   a cylinder formed in the radially inner side of said C-shaped housing,
   a piston removably received in said cylinder and operatively aligned adjacent the radially inner surface of said ring disc,
   a first friction pad removably received in the radially outer side of said C-shaped housing and adapted to engage the radially outer surface of said ring disc and be self energizing thereon when said ring disc is rotating in said normal direction,
a plate pivotally mounted to said torque plate and operatively positioned between the radially outer end of said piston and the radially inner surface of said ring disc, the pivotal mounting of said plate being in a direction downstream from the C-shaped housing in relation to the normal direction of rotation of the ring disc, and
a second friction pad removably received on the radially outer surface of the plate and adapted to engage the radially inner surface of the ring disc in substantially opposed relationship to said first friction pad, and be self-energizing thereon when said ring disc is rotating in said normal direction, said self-energization of said friction pads on said ring disc being between about 50% and about 100% as determined by the relationship of said pivotal mounting of said C-shaped housing and said plate and the lining coefficient.

2. In a brake the combination of
a rotatable member,
a non-rotatable torque plate,
an endless ring disc operatively affixed to the rotatable member,
a housing mounted to the torque plate for pivotal movement in relation thereto and substantially in the plane thereof and operatively positioned around said ring disc,
a cylinder formed in the radially inner side of said housing,
a piston removably received in said cylinder and operatively aligned adjacent the radially inner surface of said ring disc,
a first friction pad removably received in the radially outer side of said housing and adapted to engage the radially outer surface of said ring disc upon pivotal movement of said housing in one direction,
an arm mounted to said torque plate for pivotal movement in relation thereto and substantially in the plane thereof and operatively positioned between the radially outer end of said piston and the radially inner surface of said ring disc, and
a second friction pad removably received on the radially outer surface of said arm and adapted to engage the radially inner surface of the ring disc in substantially opposed relationship to said first friction pad upon the pivotal movement of said arm in a direction opposite to said one direction of pivotal movement of said housing.

3. In a brake for a rotatable member the combination of
a non-rotatable member,
an endless ring disc operatively affixed to the rotatable member,
a housing pivotally mounted to the non-rotatable member and operatively positioned around said ring disc, said pivotal mounting being within said ring disc in an upstream direction from the housing in relation to the normal direction of rotation of the ring disc,
pressure means operatively carried by said housing and aligned adjacent the radially inner surface of said ring disc,
a first friction pad removably received in the radially outer side of said housing and adapted to engage the radially outer surface of said ring disc,
a plate pivotally mounted to said non-rotatable member and operatively positioned between the end of said pressure means and the radially inner surface of said ring disc, the pivotal mounting of said plate being within said ring disc in a direction downstream from the housing in relation to the normal direction of rotation of the ring disc, and a second friction pad removably received on the radially outer surface of the plate and adapted to engage the radially inner surface of the ring disc in substantially opposed relationship to said first friction pad.

4. In a brake the combination of
a rotatable member,
a non-rotatable torque plate mounted adjacent to said member,
a ring disc operatively affixed to said rotatable member in adjacent relationship to said torque plate,
a first friction pad pivotally mounted to said torque plate and adapted to engage the radially outer surface of said ring disc, said pivotal mounting being within said ring disc in an upstream direction from said friction pad in relation to the normal direction of rotation of said ring disc,
a second friction pad pivotally mounted to said torque plate and adapted to engage the radially inner surface of said ring disc in substantially opposed relationship to said first friction pad, said pivotal mounting of said second friction pad being within said ring disc in a downstream direction from said second friction pad in relation to the normal direction of rotation of said ring disc,
pressure actuation means operatively affixed to said first friction pad and operatively engaging said second friction pad so that when said pressure actuation means is actuated both friction pads are brought into opposed engagement with their respective surfaces of said ring disc with equal, but opposite force.

5. In a brake, a rotatable member,
a non-rotatable torque plate mounted adjacent said rotatable member,
an endless ring disc operatively affixed to said rotatable member and positioned adjacent said torque plate,
a lever arm pivotally mounted at one end to said torque plate with the other end of said lever extending in a substantially downstream direction in relation to the normal direction of rotation of said ring disc,
a first friction pad operatively affixed to said other end of said lever and adapted to engage the radially outer surface of said ring disc,
a second lever arm pivotally mounted at one end to said torque plate in substantially spaced relation to said first lever arm and with the other end of said second lever extending in a substantially upstream direction in relation to the normal direction of rotation of said ring disc,
a second friction pad operatively affixed to said second lever arm at said other end thereof and adapted to engage the radially inner surface of said ring disc in substantially opposite relationship to said first friction pad, and
pressure means operatively carried by said first lever arm and operatively engaging said second lever arm so that said friction pads are forced against their respective surfaces of said ring disc with equal and opposite pressures when said pressure means are actuated.

6. In a brake, a rotatable member,
a non-rotatable torque plate mounted adjacent said rotatable member,
an endless ring disc operatively affixed to said rotatable member, and positioned adjacent said torque plate,
a lever arm pivotally mounted at one end to said torque plate with the other end of said lever extending in a substantially downstream direction in relation to the normal direction of rotation of said ring disc,
a C-shaped brake housing operatively affixed to said other end of said lever and operatively extending around said ring disc,
a first friction pad operatively affixed to said housing and adapted to engage the radially outer surface of said ring disc,
a second lever arm pivotally mounted at one end to said torque plate in substantially spaced relation to said first lever arm and with the other end of said second lever extending in a substantially upstream direction in relation to the normal direction of rotation of said ring disc, a second friction pad operatively affixed to said second lever arm at said other end thereof and adapted to engage the radially inner surface of said ring disc in substantially opposite relationship to said first friction pad, and pressure means operatively carried by said housing and operatively engaging said second lever arm so that said friction pads are forced against their respective surfaces of said ring disc with equal and opposite pressures when said pressure means are actuated.

7. In a brake the combination of a rotatable member, a non-rotatable member mounted adjacent the rotatable member, a C-shaped brake housing operatively extending around said rotatable member, means operatively affixed to said brake housing and pivotally mounting said brake housing to said non-rotatable member, said pivotal mounting being within the circumference of the rotatable member in an upstream direction in relation to the normal rotation of said rotatable member, a first friction block removably affixed to said brake housing and adapted to engage the radially outer surface of said rotatable member, a plate pivotally mounted to said non-rotatable member, said pivotal mounting being within the circumference of the rotatable member and downstream to said brake housing in relation to the normal rotation of said rotatable member, a second friction block removably affixed to said plate and adapted to engage the radially inner surface of said rotatable member in opposed relation to said first friction block, and means operatively affixed to said brake housing and operatively engaging said plate to move said friction blocks into engagement with said rotatable member with equal and opposite forces when actuated.

8. In a brake, a rotatable member having concentric inner and outer surfaces, a stationary member, a first brake shoe pivotally mounted on the stationary member in arcuately displaced relation from a radius through said first brake shoe so as to engage with the outer surface of the rotatable member with a self energizing action upon one way rotation of the rotary member, a second brake shoe pivotally mounted on the stationary member in arcuately displaced relation from a radius through said second brake shoe so as to engage with the inner surface of the rotatable member, in substantially opposed relation to the first brake shoe, with a self energizing action upon said one way rotation of the rotary member, said self energizing actions of the first and second brake shoes substantially counterbalancing each other to eliminate any radial force tending to move the rotary member out of rotary balance, and means for moving the shoes to and from engagement with the rotary member.

9. In a brake the combination of a rotatable member having concentric inner and outer surfaces, a stationary member, a first brake shoe pivotally mounted on the stationary member in an upstream direction from a radius through said first brake shoe in relation to the normal direction of rotation of said rotatable member so as to engage with the outer surface of the rotatable member with a self energizing action upon the normal rotation of the rotatable member, the degree of self energization defined by the composition of the brake shoe and the distance upstream of the pivotal mounting of said first brake shoe, a second brake shoe pivotally mounted on said stationary member in an arcuately displaced downstream direction from a radius through said second brake shoe so as to engage with the inner surface of said rotatable member in substantially opposed relationship to said first brake shoe with a self energizing action upon said one way rotation of the rotary member, said second brake shoe being of substantially the same composition and having substantially the same distance of downstream mounting as the upstream mounting of said first brake shoe.

10. In a brake the combination of a rotatable member having concentric inner and outer surfaces, a stationary member, a first brake shoe pivotally mounted on the stationary member for pivotal movement in relation thereto and substantially in the plane thereof with the pivotal mounting being arcuately displaced in an upstream direction from a radius through said first brake shoe to define a torque arm so that said first brake shoe may engage with the outer surface of the rotatable member with a self energizing action upon one way rotation of the rotatable member, and a second brake shoe pivotally mounted on the stationary member for pivotal movement in relation thereto and substantially in the plane thereof in arcuately displaced downstream relation from a radius through said second brake shoe to define a torque arm so that said second brake shoe may engage with the inner surface of said rotatable member in substantially opposed relationship to said first brake shoe with a self energizing action upon said one way rotation of the rotary member.

References Cited by the Examiner

UNITED STATES PATENTS

| | | | |
|---|---|---|---|
| 2,201,293 | 5/40 | Hoppenstand | 188—76 |
| 2,285,241 | 6/42 | Walther | 188—76 |
| 3,098,545 | 7/63 | Murphy | 188—76 |

MILTON BUCHLER, *Primary Examiner.*

RALPH D. BLAKESLEE, *Examiner.*